(12) United States Patent
Fan (10) Patent No.: US 9,749,002 B1
(45) Date of Patent: Aug. 29, 2017

(54) CLAMPING APPARATUS FOR PORTABLE ELECTRONIC DEVICE

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 15/401,822

(22) Filed: Jan. 9, 2017

(51) Int. Cl.
*H04M 1/00* (2006.01)
*H04B 1/38* (2015.01)
*H04B 1/3888* (2015.01)
*H04M 1/04* (2006.01)

(52) U.S. Cl.
CPC ............ *H04B 1/3888* (2013.01); *H04M 1/04* (2013.01)

(58) Field of Classification Search
CPC ...... H04M 1/04; H04M 1/185; H04M 1/6041; H04M 1/6075; H04B 1/3822; H04B 1/3877; H04B 1/3888; H04B 2001/3855
USPC .................. 455/90.3, 575.1, 575.8
See application file for complete search history.

(56) References Cited

U.S. PATENT DOCUMENTS

| | | | | |
|---|---|---|---|---|
| 5,555,302 A | * | 9/1996 | Wang | B60R 11/0241 379/426 |
| 5,825,874 A | * | 10/1998 | Humphreys | B60R 11/0241 379/446 |
| 5,836,563 A | * | 11/1998 | Hsin-Yung | B60R 11/0241 379/454 |
| 7,540,459 B2 | * | 6/2009 | Asano | B60R 11/0241 379/455 |
| 7,920,905 B2 | * | 4/2011 | Bury | B60R 11/0241 379/445 |
| 8,638,557 B2 | * | 1/2014 | Tsai | F16M 11/041 248/919 |
| 9,080,714 B2 | * | 7/2015 | Minn | B60R 11/0241 |
| 9,108,096 B2 | * | 8/2015 | Solheim | A63B 69/3632 |

* cited by examiner

*Primary Examiner* — Quochien B Vuong
(74) *Attorney, Agent, or Firm* — Rabin & Berdo, P.C.

(57) ABSTRACT

A clamping apparatus includes: a base defining a holding plate; two clamping units installed on the machine base and movable relative to each other; a unidirectional restriction unit restricting the clamping units from moving toward a center of the holding plate, having a portion exposed to an exterior of the holding plate such that an applied pressure results in withdrawal of the portion into the base and releases the clamping units from moving, thereby permitting the clamping units to move toward each other to clamp an electronic device tightly; and a manipulating unit is disposed in the base and has an manipulating part exposed to an exterior of the base such that activation of the manipulating part results in causing simultaneous movement of the clamping units away from each other and releasing the electronic device from the clamping units.

10 Claims, 12 Drawing Sheets

ABSTRACT# CLAMPING APPARATUS FOR PORTABLE ELECTRONIC DEVICE

BACKGROUND OF THE INVENTION

1. Field of the Invention

The present invention relates generally to a clamping apparatus, and more particularly to a clamping apparatus for a portable electronic device, including two clamping units capable of quickly and tightly clamping the portable electronic device once placed thereon and when the clamping force is removed, the two clamping units moves gradually away from each other so as to release the portable electronic from clamping therebetween.

2. The Prior Arts

Portable electronic devices (such as mobile phones, GPS and driving recorders) are prevalent nowadays and are mounted in vehicles, on motorbikes or in offices by means of clamping apparatuses.

A conventional clamping apparatus generally includes a machine base and two clamping arms installed on two opposite sides of the machine base for clamping an electronic device therebetween. Due to different of interior structures so does the movements of the clamping arms differ relative to each other. The conventional clamping apparatuses of earlier times require manual action to move the clamping arms away from each other to a greatest distance and after placing the electronic device therebetween, the clamping arms are moved manually toward each other to engage by means of ratchet mechanism such that the clamping arms tightly clamp two opposite sides of the electronic device. To release the electronic device, a release button is pressed manually to simultaneously move the clamping arms away from each other to their initial position. It is noted that at least the index finger and the thumb are used to move the clamping arms toward each other during the clamping of the device therebetween. Therefore, it is inconvenient for those persons whose thumbs and index fingers are not large enough to reach the clamping arms for moving toward each other.

To eliminate the above-stated drawback, a clamping apparatus has been proposed, which includes two clamping arms spaced apart from each other at the greatest distance such that after placing a mobile phone thereon, a press button is activated in order to move the clamping arms toward each other, thereby clamping the mobile phone tightly therebetween. To release the mobile phone, another interlocking button is activated so as to move the clamping arms away from each other to the greatest distance. The previously described clamping apparatus is intended for portable devices of multiple sizes, a navigation device of large dimension or a mobile phone of compact dimension. Whenever the clamping arms are spaced apart at the greatest distance, a mobile phone of compact size placed thereon is likely to fall off the apparatus prior to movement of the clamping arms toward each other or away from each other, thereby causing inconvenience to the user of the mobile phone with a compact size.

SUMMARY OF THE INVENTION

A primary objective of the present invention is to provide a clamping apparatus including novel interior structures to permit easy placing of a portable electronic device thereon or releasing of the electronic device therefrom. Placing of the portable electronic device on the clamping apparatus activates a unidirectional restriction unit, which in turn, permits movement of two clamping units toward each other, thereby clamping the electronic device tightly therebetween. To release the electronic device, a manipulating unit is activated, which in turn, permits movement of two clamping units away from each other, thereby permitting removal of the electronic device from the clamping apparatus of the present invention.

Another objective of the present invention is to provide a clamping apparatus including a manipulating unit, activation of the same each time results only a limited movement of the clamping units away from each other, thereby providing convenience to the user in fetching the electronic device without falling off the clamping apparatus of the present invention. In other words, the clamping units are required to move toward each other only within said limited distance next time, when placing the electronic device on the clamping apparatus of the present invention, thereby permitting swift placing of the electronic device on the clamping apparatus.

For achieving the foregoing objectives, a clamping apparatus according to the present invention includes: a machine base defining a holding plate that is adapted to receive an electronic device thereon and that is formed with an opening; left and right clamping units installed on two opposite sides of the machine base and movable relative to each other and a tension spring interconnecting the clamping units under tension; a unidirectional restriction unit installed within the base, connected operably with the clamping units and restricting the clamping units from moving toward a center of the holding plate, the restriction unit having a portion extending through the opening so as to be exposed to an exterior of the holding plate such that an applied external pressure results in withdrawal of the portion into the opening and releases the clamping units from moving, thereby permitting the clamping units to move simultaneously toward the center of the holding plate so as to clamp the electronic device tightly due to tension action of the tension spring; and a manipulating unit disposed within the base, including a gear set operably connected to the clamping units for simultaneous movement, a movable pinion disposed movably within the base, non-meshed with the gear set in a normal condition and a push element having a transmission rack meshed with the movable pinion and an manipulating part exposed to an exterior of the base in the normal condition such that activation of the manipulating part results in movement of the pinion to mesh with the gear set, thereby causing simultaneous movement of the clamping units away from each other and releasing the electronic device from the clamping units.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
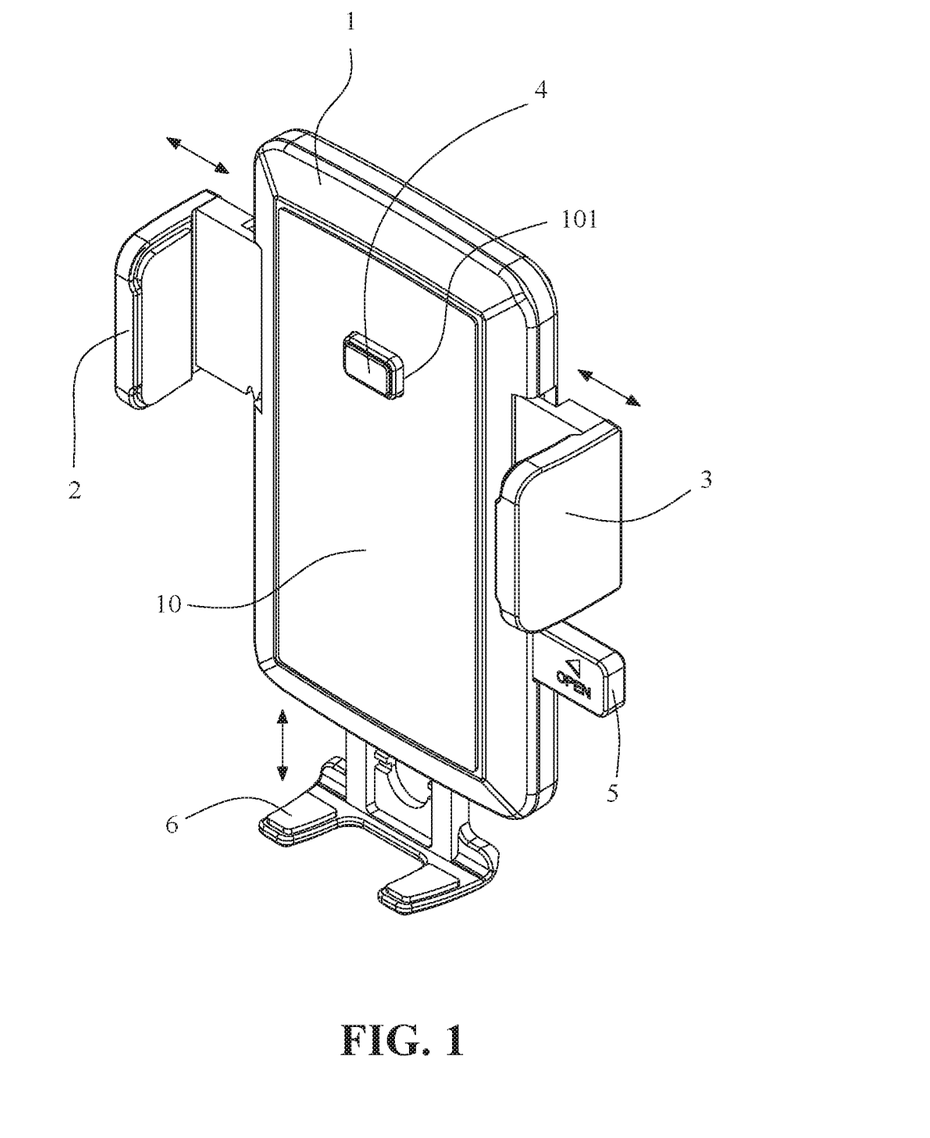
FIG. 1 is a perspective front view of a clamping apparatus of the present invention for a portable electronic device.

FIG. 1 is a perspective front view of a clamping apparatus of the present invention for a portable electronic device. As shown, the clamping apparatus of the present invention includes a machine base 1, left and right clamping units 2, 3, a unidirectional restriction unit 4 and a manipulating unit 5. The machine base 1 defines a holding plate 10 that is adapted to receive an electronic device (see FIG. 7A) thereon and that is formed with an opening 101. The left and right clamping units 2, 3 are installed on two opposite sides of the machine base 1 and are movable relative to each other. The unidirectional restriction unit 4 is installed within the base 1, is connected operably with the clamping units 2, 3 in such a manner to restrict the clamping units 2, 3 from moving toward a center of the holding plate 10 (relative to each other). The manipulating unit 5 is disposed within the base 1 and activation of the same causes simultaneous movement of the clamping units 2, 3 away from each other and releasing the electronic device from the clamping units 2, 3.

Figure 2:
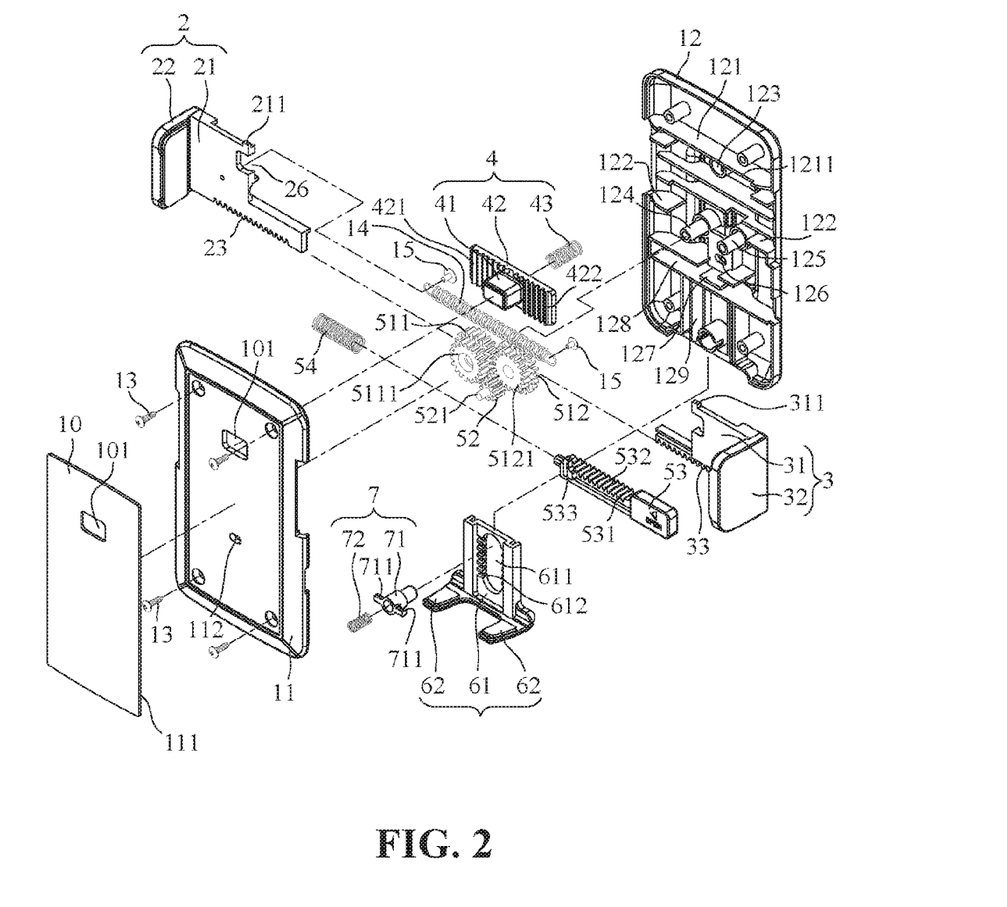
FIG. 2 is an exploded and perspective view of the clamping apparatus of the present invention for a portable electronic device.
Figure 3:
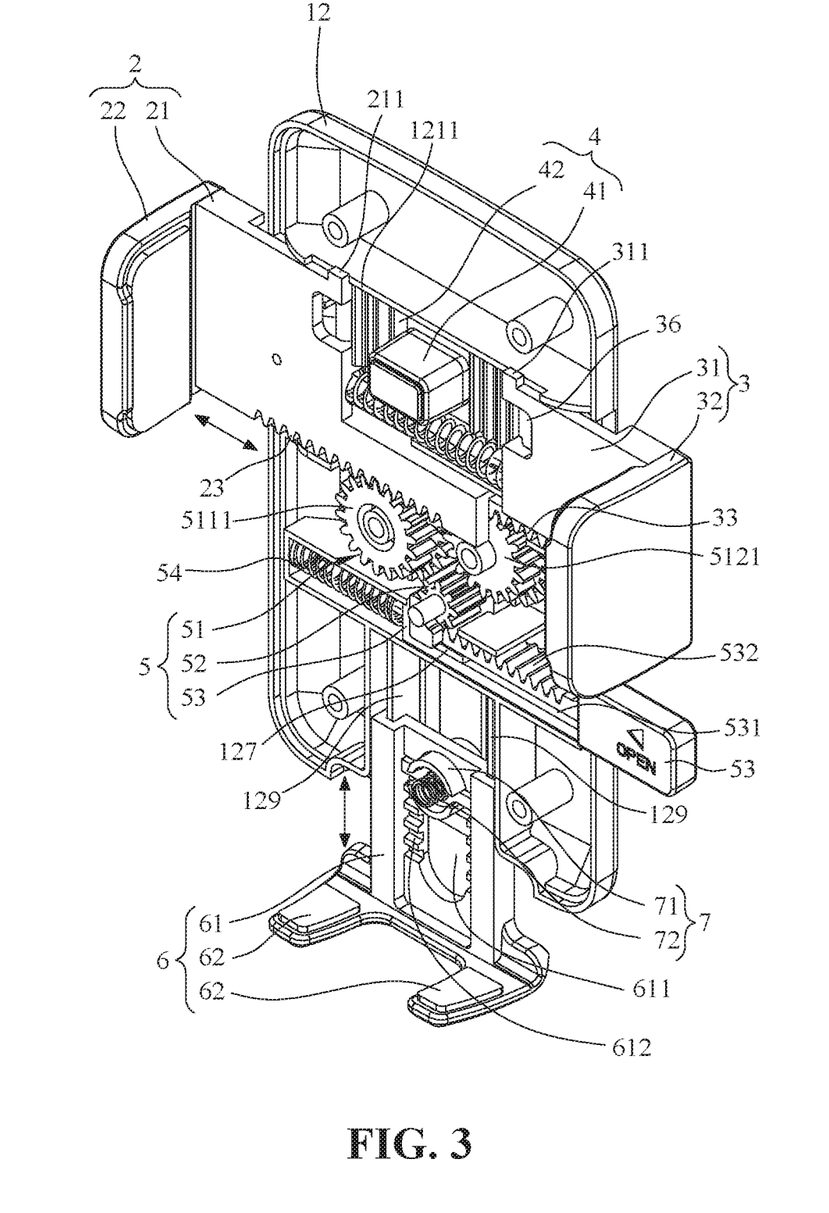
FIG. 3 is a partly exploded view of the clamping apparatus of the present invention, illustrating interior structures thereof.

Referring to FIGS. 2 and 3, wherein FIG. 2 is an exploded and perspective view of the clamping apparatus of the present invention 1 and FIG. 3 is a partly exploded view of the clamping apparatus of the present invention, illustrating interior structures thereof. As shown, the machine base 1 is constituted by front and rear casings 11, 12 coupled to each other by means of screws 13 to receive the unidirectional restriction unit 4 and the manipulating unit 5 therebetween. The front casing 11 is generally a panel. A protection sheet 111 is adhesively attached to the front casing 11 to define the holding plate 10 to protect the front casing 11 and the electronic device from being scratched, thereby maintaining an aesthetic appearance of the clamping apparatus of the present invention and the electronic device.

Each of the left and right clamping units 2, 3 has a movable plate 21, 31 that is formed with an elongated rack 23, 33 and that is movable relative to each other between a distance defined by the front and rear casings 11, 12 toward a center of the holding plate 10 or away from each other. Note that the rear casing 12 is formed with two parallel partitions 121, 122 defining a size of the movable plate 21, 31. Each of the movable plates 21, 31 is formed with a stop element 211, 311 slidable within a restriction slit 1211 of the upper partition 121, thereby preventing untimely disengagement of the left and right clamping units 2, 3 from the machine base 1.

Figure 4:
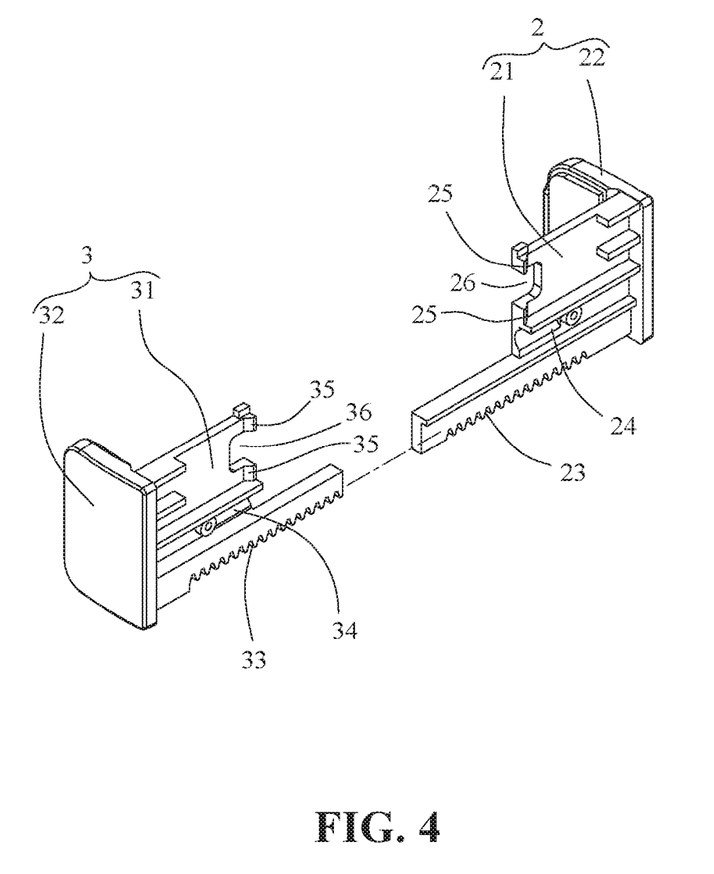
FIG. 4 shows a perspective view of two clamping units employed in the clamping apparatus of the present invention, illustrating a detailed structure of two clamping units.

As best shown in FIGS. 2 and 4, the left clamping unit 2 further includes a clamping plate 22 extending perpendicularly from the movable plate 21. The movable plate 21 is further formed with a reception channel 24 located above the rack 23, a left barbed portion 25 and a notch 26 between the left barbed portion 25 and the reception channel 24.

The right clamping unit 3 further includes a clamping plate 32 extending perpendicularly from the movable plate 31. The movable plate 31 is further formed with a reception channel 34 located above the rack 33, a right barbed portion 35 and a notch 36 between the right barbed portion 35 and the reception channel 34 such that after assembly the unidirectional restriction unit 4 is confined between the left and right notches 26, 36 of the movable plates 21, 31 such that the clamping plates 22, 32 are exposed from the front and rear casings 11, 12. The manipulating unit 5 includes a gear set 51 having a pair of fixed gears 511, 512 meshed respectively with the elongated rack 23, 33 of the left and right movable plates 21, 3 in such a manner that the elongated rack 33 is located at an elevation higher than the elongated rack 23, thereby permitting simultaneous movement of the left and right clamping units 2, 2 upon activation of the gear set 51.

Figure 5:
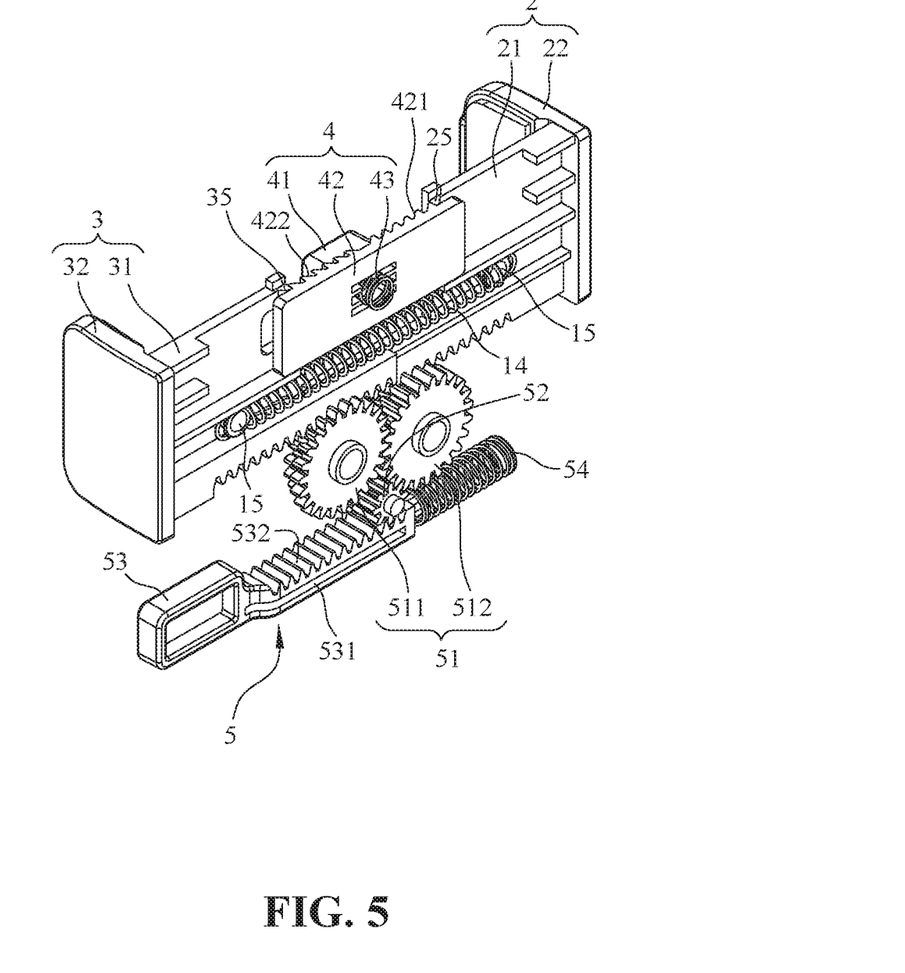
FIG. 5 shows a perspective view of two clamping units, a unidirectional restriction unit and a manipulating unit employed in the clamping apparatus of the present invention, illustrating their connection structure.

Referring to FIGS. 2 and 5, a tension spring 14 is disposed within the reception channels 24, 34 of the movable plates 21 and has two ends interconnecting the movable plates 21, 31 under tension, thereby pulling the left and right clamping plates 22, 32 toward a center of the holding plate 10 for clamping a portable electronic device (not visible) between the clamping plates 22, 32 of the clamping units 2, 3.

Referring to FIGS. 1 and 2 again, the unidirectional restriction unit 4 is disposed between the front and rear casings 11, 12, has a portion extending through the opening 101 so as to be exposed to an exterior of the holding plate 10 such that an applied external pressure, such as placing the portable electronic device on the holding plate 10, results in withdrawal of the portion into the opening 101 and releases the clamping units 2, 3, thereby permitting the clamping units 2, 3 to move simultaneously toward the center of the holding plate 10 so as to clamp the portable electronic device tightly due to tension action of the tension spring 14. Preferably, the unidirectional restriction unit 4 includes a rectangular press plate 42 having left and right toothed portions 421, 422, a press button 41 serving as the portion and in form a hollow body disposed on the press plate 42 between the left and right toothed portions 421, 422 and a spring 43 disposed in the spring hole 123 in the rear casing 12 behind and biasing the press plate 42 in such a manner that the press button 41 is exposed to the exterior of the holding plate 10 of the front casing 11 via the opening 101.

Note the left and right movable plates 21, 31 have the left and right barbed portions 25, 35 engaged respectively with the left and right toothed portions 421, 422 of the press plate 42, thereby retaining the left and right clamping units 2, 3 at a certain distance from each other and simultaneously restricting the left and right clamping unit 2, 3 from moving toward the center of the holding plate 10. It is to note that placing of the electronic device on the holding plate 10 can result in application of the external force on the press button 41, which in turn, results in compression of the spring 43 and simultaneous withdrawal of the pressing plate 42 and releasing engagement of the barbed portions 25, 35 of the movable plates 21, 31 from the left and right toothed portions 421, 422 of the press plate 42. At this time, the left and right clamping plates 22, 32 of the clamping units 2, 3 are pulled relative to each other toward the center of the holding plate 10 due to tension force of the spring 14.

The manipulating unit 5 is disposed within the base 1, further includes a movable pinion 52 disposed movably within the base 1, non-meshed with the fixed gears 511, 512 of the gear set 51 in a normal condition and a push element 53 having a transmission rack 532 meshed with the movable pinion 52 and an manipulating part 53 exposed to an exterior of the base 10 such that activation of the manipulating part 53 results in movement of the movable pinion 52 to mesh with the fixed gears 511, 512 of the gear set 51, thereby causing simultaneous movement of the clamping units 2, 3 away from each other and releasing the electronic device from the clamping units 2, 3. To be more specific, in this embodiment, each of the fixed gears 511, 512 is mounted rotatably around the mounting axles 124, 124 of the rear casing 12, and is further provided a co-axially connected small gears 5111, 5121 for meshing with respectively with the elongated racks 23, 33 of the movable plates 21, 31 of the left and right clamping units 2, 3.

Note that the rotating axle 521 of the movable pinion 52 is journalled between a pair of bearing slots 112, 126 in the front and rear casings 11, 12 to permit limited movement of the movable pinion 52 and is non-meshed with the fixed gear 511 of the gear set 51 in a normal condition, as best shown in the leftmost side in FIG. 3. Only when the movable pinion 52 is moved to the leftvise direction it does mesh with the fixed gear 511 of the gear set 51.

In this embodiment, the push element 53 is formed with an axial guide slot 531. The rear casing 12 of the machine base 1 further includes a guide stub 127 disposed stationarily therein and extending through the axial guide slot 531 in the push element 53 so as to define a traveling direction and prevent untimely removal of the push element 53 relative to the movable pinion 52 and hence the machine base 1. Preferably, the manipulating unit 5 further includes a biasing spring 54 disposed within a spring channel 128 in the rear casing 12 along the moving direction of the movable pinion 52 for biasing one end of the push element 53 in such a manner that the manipulating part 53 is exposed to an exterior of the machine base 1 in the normal condition. To be more specific, the push element 53 is provided with an impelling piece 533 relative to the movable pinion 52 such that when the one end of the push element 53 is biased by the biasing spring 54 so as to expose the manipulating part 53 to an exterior of the base 10, the impelling piece 533 sustains the movable pinion 52 to a position, where the movable pinion is non-meshing with the fixed gear 511 of the gear set 51. However, inward pushing of the manipulating part 53 relative to the machine base 1 can result in movement of the movable pinion 52 to mesh with the fixed gear 511, which in turn, causes simultaneous movement of the clamping units 2, 3 away from each other. Upon removal of the pushing force, the manipulating part 53 retrieves to its initial position, i.e., the manipulating part 53 is exposed to the exterior of the machine base 1 in the normal condition.

Figure 6:
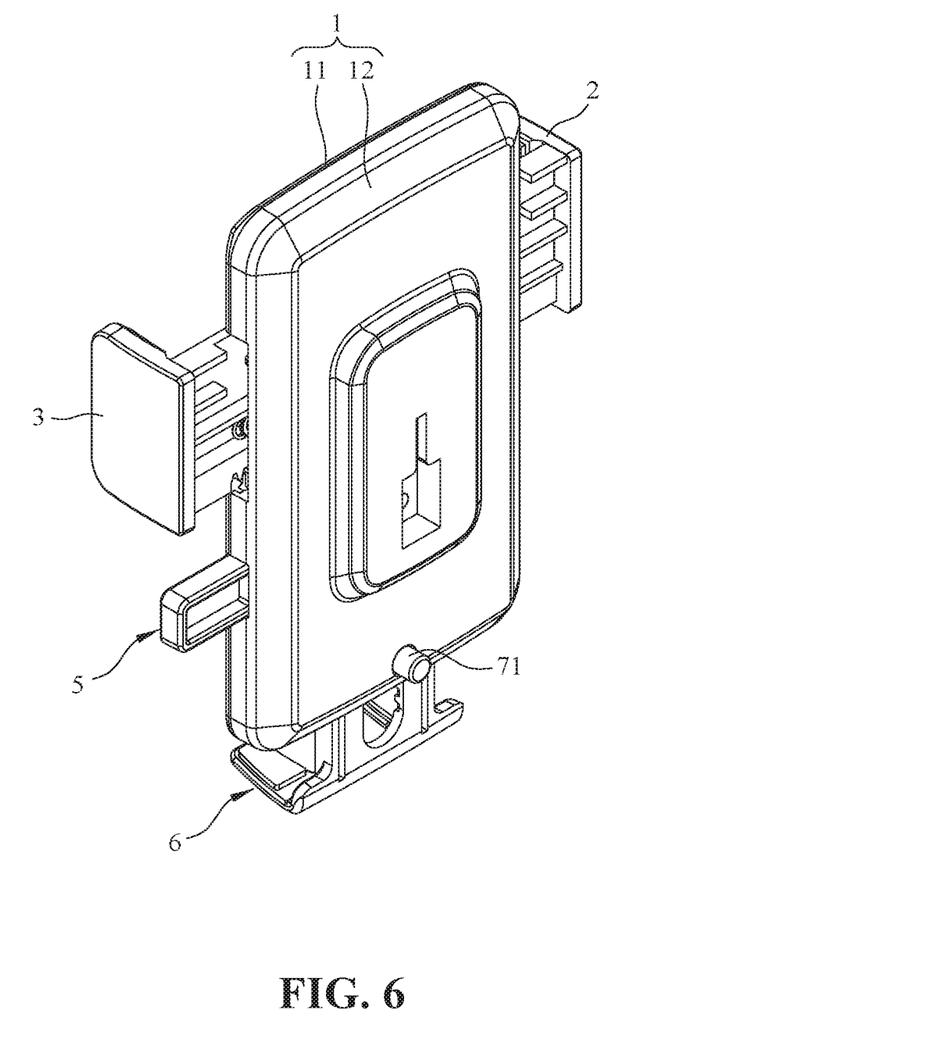
FIG. 6 is a perspective rear view of the clamping apparatus of the present invention for a portable electronic device.

One aspect to note is that different electronic devices, like mobile phones or driving recorders, manufactured by different companies have different dimensions and press buttons with several configurations, in order to prevent the clamping units 2, 3 of the present clamping apparatus from undesirably clamping the press button of the electronic device, a support unit 6 is installed within the machine base 1. The support unit 6 preferably includes a movable block 61 mounted to the rear casing 12, is movable in a direction transverse to the moving direction of the clamping units 2, 3 and two support stems 61, 62 projecting outwardly from the movable block 61 such that after assembly the support stems 61, 62 are exposed to an exterior of the machine base 1. Preferably, the movable block 61 is formed with a fixing aperture 611 and two vertical rows of fixing teeth 612 adjacent to and extending along two opposite sides of the fixing aperture 611. The clamping apparatus of the present invention further includes a fixing device 7 disposed in the fixing aperture 611 to permit movement of the movable block 61 in the transverse direction relative to the movement direction of the clamping units 2, 3 and preventing untimely disengagement of the movable block 61 from the machine base 1. Preferably, the fixing device 7 includes a compression spring 72 disposed within the fixing aperture 611 of the movable block 61 and the machine base 1 and a tubular compress member 71 having two lateral sides formed with engagement teeth 711 for selectively engaging the fixing teeth 612 of the movable block 61 after compressing against the compression spring 72 such that after assembly a portion of compress member 71 is exposed to an exterior of the holding plate 10 and determining the exposed portion of the movable block 61 with respect to the machine base 1, as best shown in FIG. 6.

FIG. 1 illustrates the clamping apparatus of the present invention after a first time use, where the left and right clamping units 2, 3 are spaced apart from each other at the greatest distance. In the event of compressing the exposed portion of the compress member 71, as best shown in FIG. 6, can result in adjustment of the exposed portion of the movable block 61 with respect to the machine base 1.

Figure 7A:
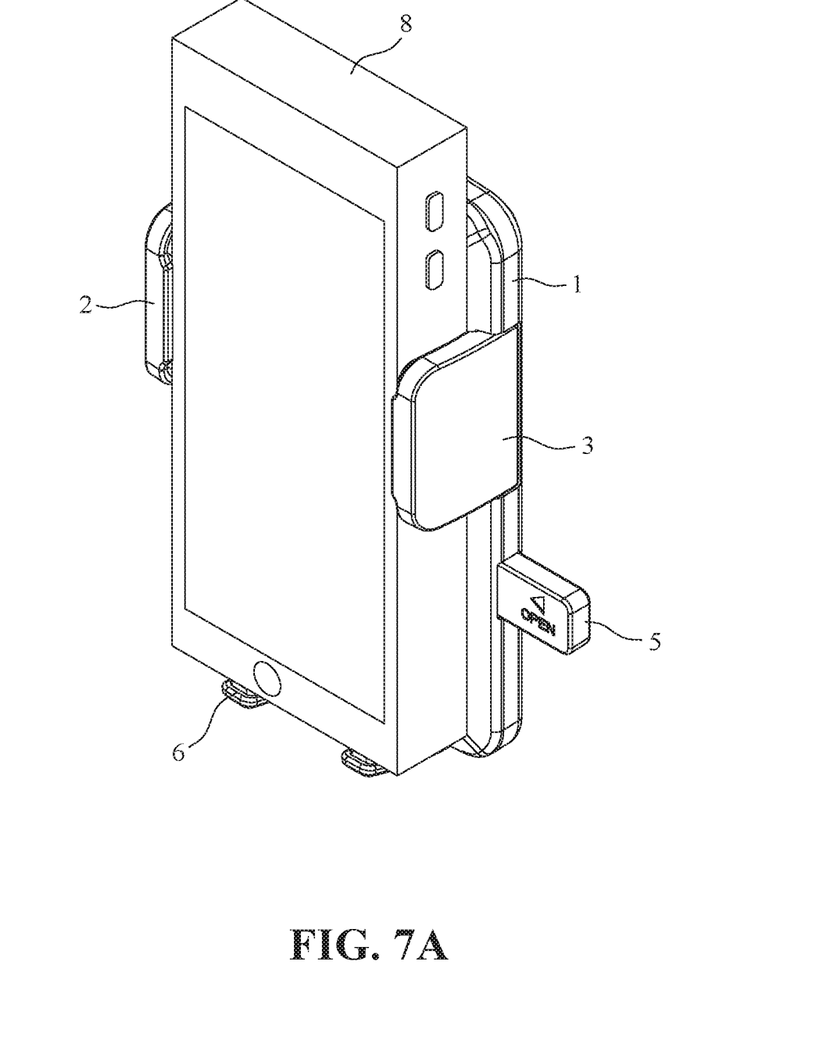
FIG. 7A shows a perspective front view of the clamping apparatus of the present invention clamping a portable electronic device.
Figure 7B:
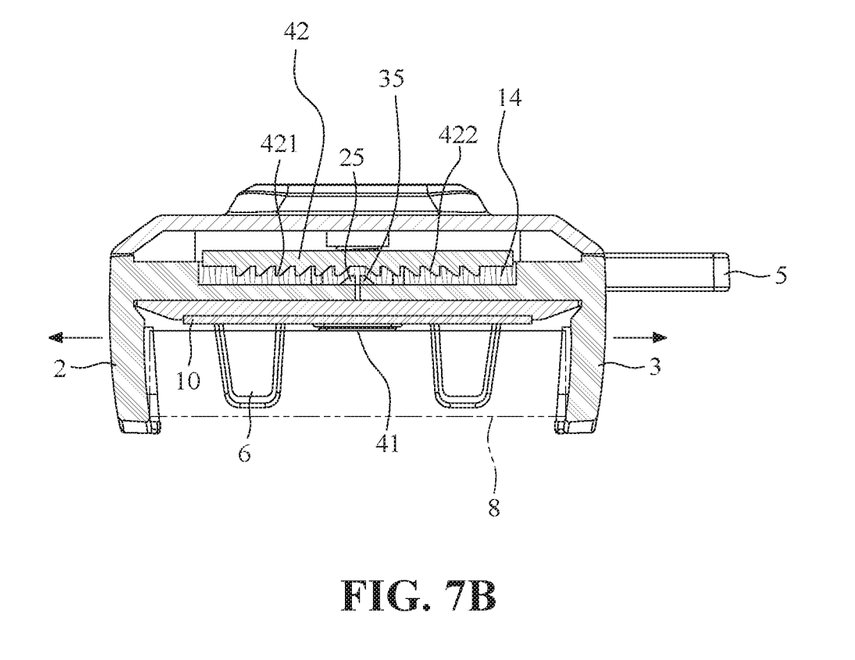
FIG. 7B shows a cross-sectional view of the clamping apparatus of the present invention during clamping a portable electronic device.
Figure 7C:
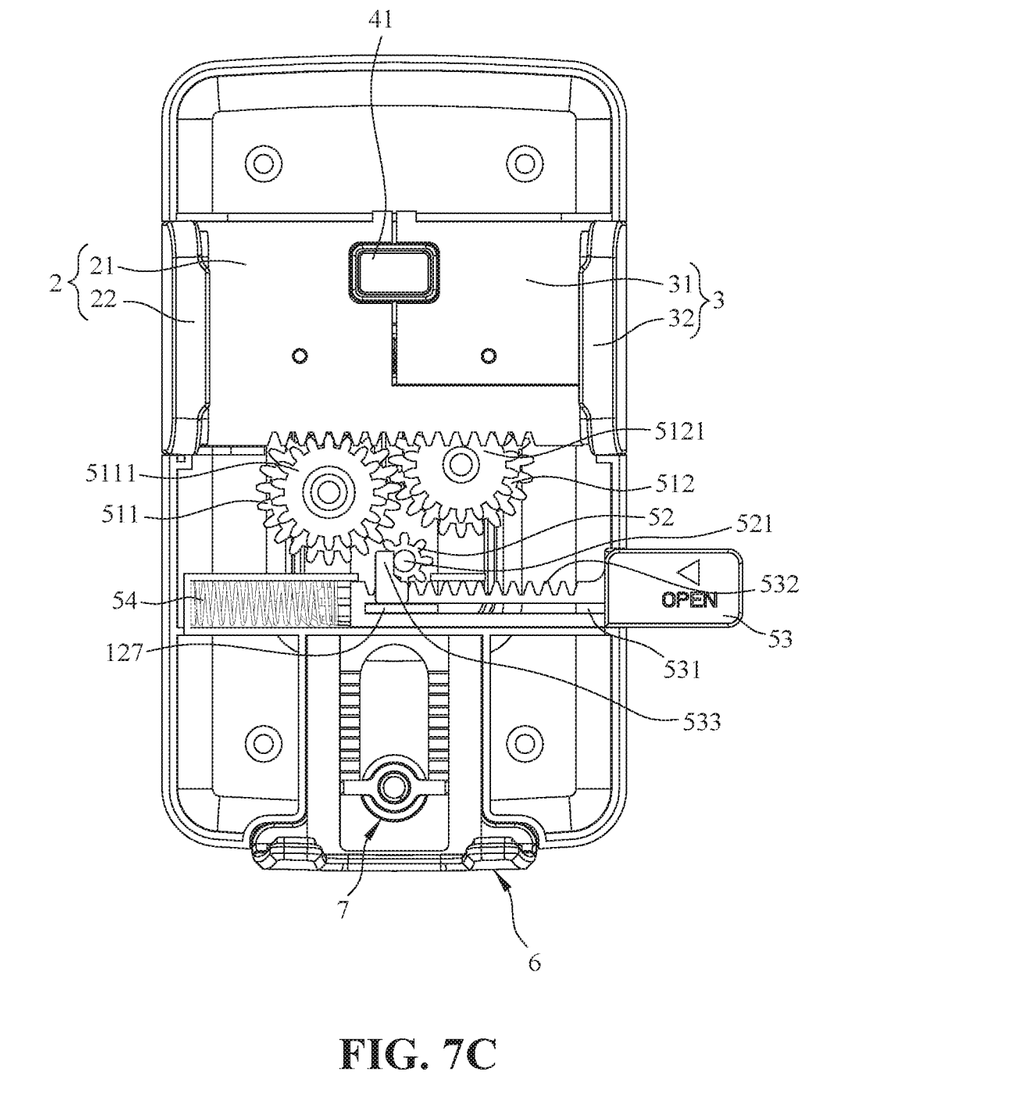
FIG. 7C illustrates interconnecting relation among two clamping units, the unidirectional restriction unit and the manipulating unit employed in the clamping apparatus of the present invention.

Referring to FIG. 7A, placing of the mobile phone 8 on the holding plate 10 results in withdrawal of the press button 41 of the unidirectional restriction unit 4 into the machine base 1, where the toothed portions 421, 422 of the press plate 42 respectively disengage from the barbed portions 25, 35 of the movable plates 21, 31, but the clamping plates 21, 31 are pulled toward the center of the holding plate 10 due to tension force of the spring 14, thereby clamping the mobile phone 8 between the clamping plates 21, 31 of the left and right clamping units 2, 3 (see dotted lines in FIG. 7B).

Figure 8:
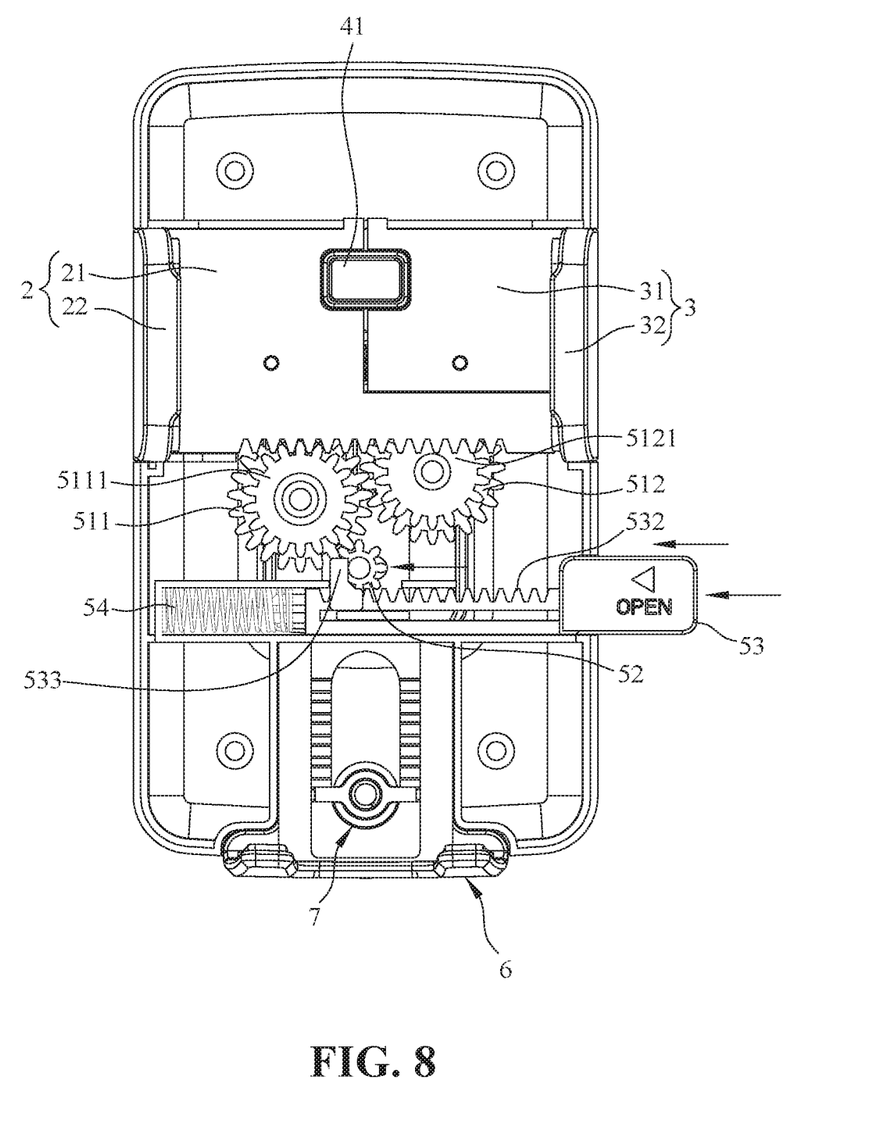
FIG. 8 illustrates interconnecting relation among the components of the clamping apparatus of the present invention, illustrating how the manipulating unit is activated during a first period.
Figure 9A:
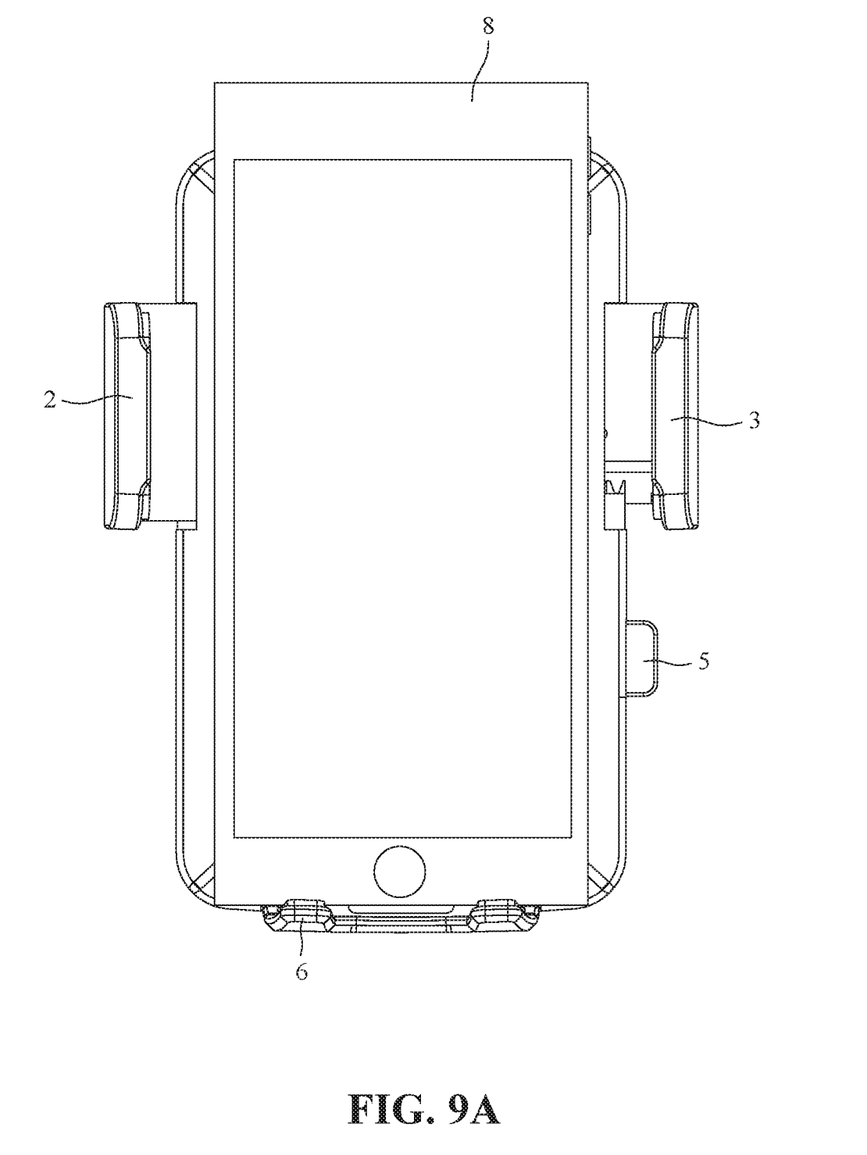
FIG. 9A shows how the manipulating unit is activated in order to move the clamping units away from each other in order to release the portable electronic device from the clamping apparatus of the present invention.
Figure 9B:
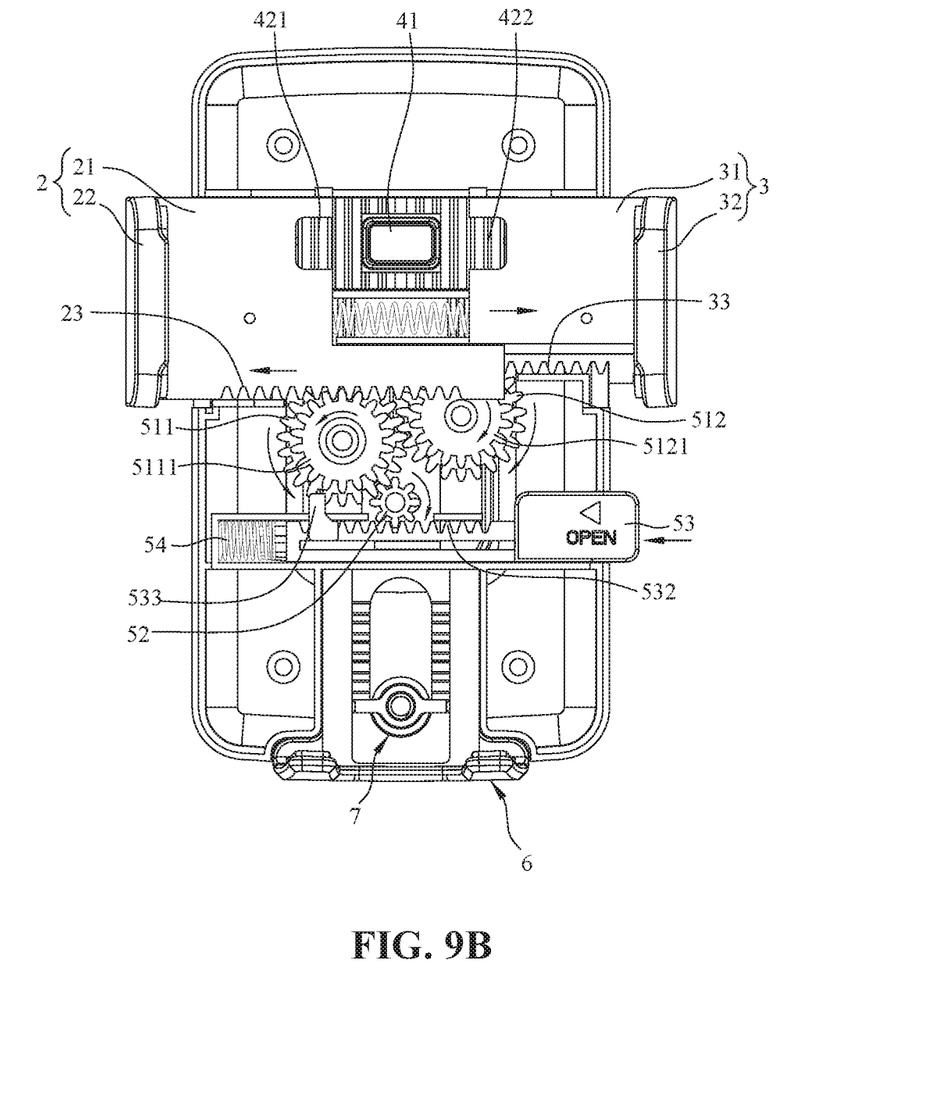
FIG. 9B shows an interior structure of the clamping apparatus of the present invention during activation of the manipulating unit in order to move the clamping units away from each other.

When it is desired to release the mobile phone 8, shown in FIG. 7B, the push element 53 is pushed inward by holding the manipulating part with respect to the machine base 1 (see arrows in FIG. 8), thereby causing the movable pinion 52 to mesh with the fixed gear 511. As shown in FIGS. 9A and 9B, further pushing inward of the push element 53 relative to the machine base 1 results in simultaneous movement of the fixed gears 511, 512, which in turn, causes the clamping plates 21, 31 to move a certain distance away from each other, thereby permitting removal of the mobile phone 8 from the holding plate 10. Note that at this time, the barbed portions 25, 35 of the movable plates 21, 31 respectively engage with the toothed portions 421, 422 of the press plate 42 due to tension force of the spring 14 and rearward biasing of the spring 43 such that the clamping plates 21, 31 of the clamping units 2, 3 are sustained away from each other at the certain distance.

An important aspect to note is that whenever the push element 53 is pushed inward each time relative to the machine base 1, the movable pinion 52 rotates only in a predetermined angle, which in turn, causes movement of the clamping units 2, 3 away from each other to a fixed distance, which facilitate removal of the mobile phone 8 from the holding plate 10. In other words, the fixed distance is large enough to permit removal of the mobile phone off the holding plate 10 and simultaneously small enough to prevent falling of the mobile phone 8 off the holding plate 10 prior to being fetched by the user.

Another aspect to note is that whenever an applied force is removed from the push element 53, the impelling piece 533 will impel the movable pinion 52 due to the biasing spring 54 so as to expose the manipulating part to an exterior of the base 10, thereby sustaining the movable pinion 52 to a position, where the movable pinion 52 is non-meshing with the fixed gear 511 of the gear set 51. In other words, if the user of the portable electronic feels the presently existing gap between the clamping units 2, 3 is too narrow to accommodate his device, he can manipulate the push element 53 as many times as he desires until the gap is large enough to accommodate the portable electronic device between the clamping units 2, 3.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A clamping apparatus, comprising:
a machine base defining a holding plate that is adapted to receive an electronic device thereon and that is formed with an opening;
left and right clamping units installed on two opposite sides of said machine base and movable relative to each other and a tension spring interconnecting said clamping units under tension;
a unidirectional restriction unit installed within said base, connected operably with said clamping units and restricting said clamping units from moving toward a center of said holding plate, said restriction unit having a portion extending through said opening so as to be exposed to an exterior of said holding plate such that an applied external pressure results in withdrawal of said portion into said opening and releases said clamping units from moving, thereby permitting said clamping units to move simultaneously toward the center of said holding plate so as to clamp the electronic device tightly due to tension action of said tension spring; and
a manipulating unit disposed within said base, including a gear set operably connected to said clamping units for simultaneous movement, a movable pinion disposed movably within said base, non-meshed with said gear set in a normal condition and a push element having a transmission rack meshed with said movable pinion and an manipulating part exposed to an exterior of said base such that activation of said manipulating part results in movement of said pinion to mesh with said gear set, thereby causing simultaneous movement of said clamping units away from each other and releasing the electronic device from said clamping units.

2. The clamping apparatus according to claim 1, wherein said unidirectional restriction unit includes a press plate having left and right toothed portions, a press button serving as said portion and in form a hollow body disposed on said press plate between said left and right toothed portions and a spring disposed behind and biasing said press plate in such a manner that said press button is exposed to said exterior of said holding plate via said opening, said clamping units having left and right barbed portions engaged respectively with said left and right toothed portions of said press plate.

3. The clamping apparatus according to claim 2, wherein once said left and right barbed portions of said clamping units are engaged respectively with said left and right toothed portions of said press plate, said clamping units are prevented from moving toward the center of said holding plate.

4. The clamping apparatus according to claim 1, wherein each of said clamping units is constituted by a movable plate formed with an elongated rack and a clamping plate extending perpendicularly from said movable plate, said gear set includes a pair of fixed gears meshed respectively with said elongated rack of said clamping units.

5. The clamping apparatus according to claim 1, wherein said push element is formed with an axial guide slot, said machine base further includes a guide stub disposed stationarily therein and extending through said axial guide slot in said push element so as to define a traveling direction and prevent untimely removal of said push element relative to said movable pinion.

6. The clamping apparatus according to claim 1, wherein said manipulating unit further includes a biasing spring disposed within said machine base for biasing one end of said push element in such a manner that said manipulating part is exposed to an exterior of said base in a normal condition.

7. The clamping apparatus according to claim 6, wherein said push element is provided with an impelling piece relative to said movable pinion such that when said one end of said push element is biased by said biasing spring so as to expose said manipulating part to an exterior of said base, said impelling piece sustains said movable pinion to a position, where the movable pinion is non-meshing with said gear set in said normal condition.

8. The clamping apparatus according to claim 1, further comprising a support unit installed within said machine base including a movable block movable in a direction transverse to moving direction of said clamping units and a support stem projecting outwardly from said movable block such that after assembly said support stem is exposed to an exterior of said machine base.

9. The clamping apparatus according to claim 8, wherein said movable block is formed with a fixing aperture and a plurality of fixing teeth adjacent to said fixing aperture, the clamping apparatus further comprising a fixing device disposed in said fixing aperture to permit movement of said movable block in said transverse direction relative to said movement direction of said clamping units and preventing untimely disengagement of said movable block 61 from said machine base.

10. The clamping apparatus according to claim 9, wherein said fixing device includes a compression spring disposed within said fixing aperture of said movable block and said machine base and a compress member having two lateral sides formed with engagement teeth for selectively engaging said fixing teeth of said movable block after compressing against said compression spring such that after assembly a portion of compress member is exposed to an exterior of said holding plate and determining the exposed portion of the movable block with respect to said machine base.

* * * * *